Patented Apr. 3, 1928.

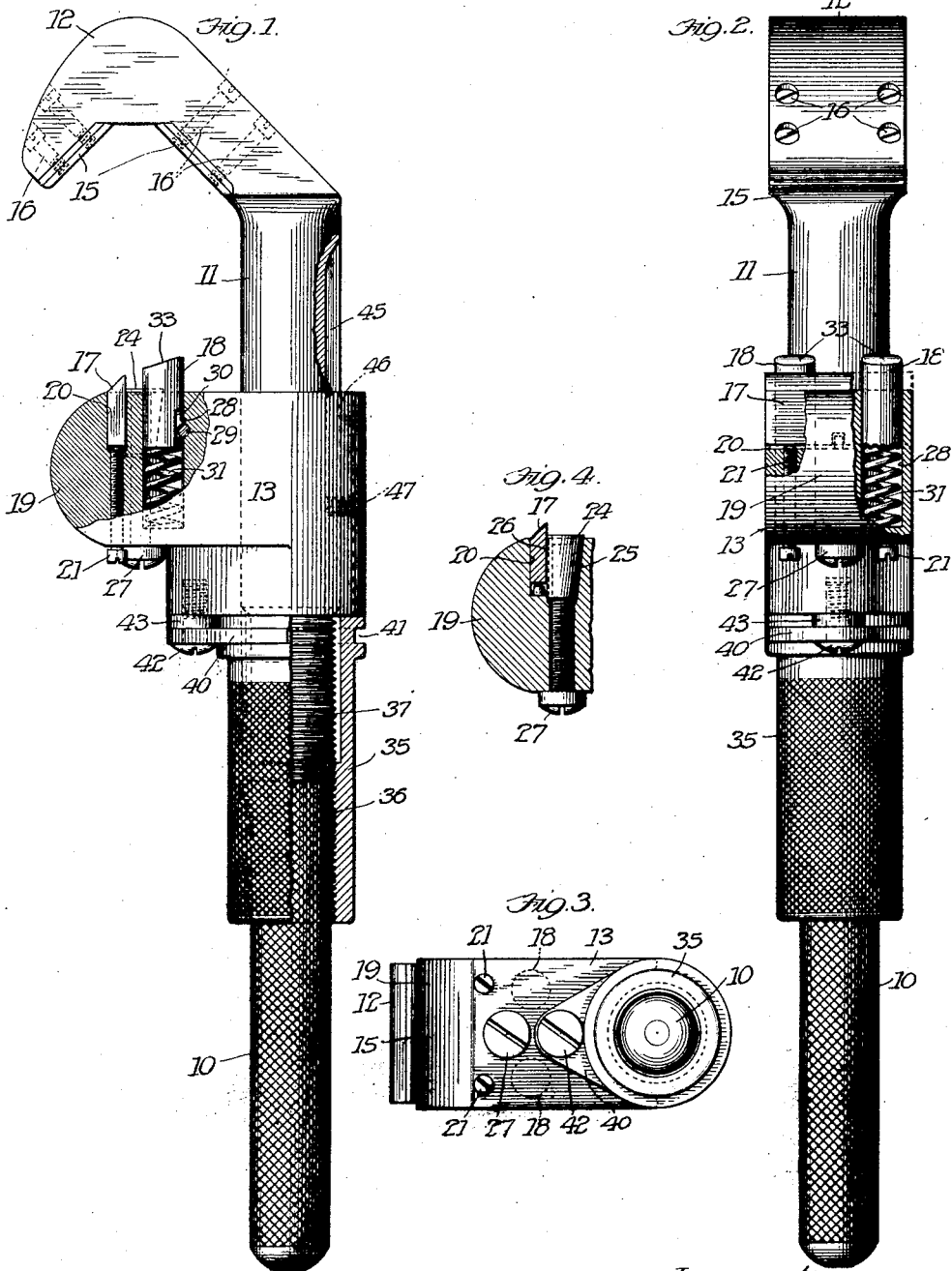

1,664,440

UNITED STATES PATENT OFFICE.

FREDERICK G. WACKER, OF CHICAGO, ILLINOIS, ASSIGNOR TO AUTOMOTIVE MAINTENANCE MACHINERY CO., OF CHICAGO, ILLINOIS, A CORPORATION OF ILLINOIS.

TOOL FOR TURNING CRANK PINS AND THE LIKE.

Application filed September 20, 1924. Serial No. 738,737.

My invention provides an improved hand-operated tool for use in turning or truing the crank-pins of automobile-engines, and other normally-cylindrical surfaces, and resides in the novel and advantageous features of construction and combinations of parts hereinafter more fully set forth and claimed.

Among the objects of my invention are to provide a tool which may be employed for the turning of automobile-engine crank-pins without removal of the crank shaft from assembled position in the engine; to so construct the tool that it may be applied and operated with greatest facility and with minimum opportunity for faulty operation so that its satisfactory use will impose the least requirement for individual skill on the part of the operator; to attain accuracy and positiveness of adjustment for accurate work, but consistently with rapid handling of the tool in its application to the work and its manual operation; and to secure simplicity, ruggedness, manufacturing facility, and economy of construction.

Other and further objects of my invention will become apparent to those skilled in the art from the following description, taken in conjunction with the accompanying drawings wherein I have illustrated, for purposes of disclosure, a single embodiment of my invention in a particular form which I have found to attain the stated objects.

In the drawings Fig. 1 is a side elevation, with parts broken away, showing the complete tool; Fig. 2 is a front elevation, with parts broken away; Fig. 3 is an end view of the device, looking at the handle-end; and Fig. 4 is a sectional detail of a fragment of the movable jaw, showing the blade-retaining means.

The handle-formed part 10 has an effective shank-continuation 11, preferably an integral forging, and with these are connected a V-jaw 12 and an opposed tool-carrying jaw 13, relatively movable in the direction of the length of the shank for engaging crank pins of different diameters. The V-jaw is preferably the relatively fixed element, forged integrally with the shank 11 as a forward extension thereof, such jaw being preferably shaped to provide bearing surfaces disposed at right angles to each other, a line bisecting the angle being parallel with the axis of the shank. Removable wear plates 15 of hardened steel, attached to the jaw structure as by screws 16, afford the shaft-contacting surfaces by which the crank-pin or other cylindrical element is cradled for the turning operation.

The tool-carrying jaw 13 carries the removable cutting tool 17, preferably arranged with its cutting edge substantially in a plane bisecting the angle between the planes of the wear plates 15, and said jaw 13 is movable to advance or retract the cutting tool in that plane. Likewise the movable jaw is provided with work-clamping means 18 yieldably mounted thereon and disposed to engage the crank-pin prior to engagement of the cutting tool therewith, and arranged to yield, as advancement of the cutting tool toward the work continues, so that said holding means may force the work, with a strong resilient pressure, into the angle of the jaw 12 during all such time as the cutting tool engages or works upon the crank-pin.

Specifically, lateral extension or head-portion 19 of movable jaw 13 receives the edged cutter or blade 17 (which may be as long as the crank-pin surface to be trued) in the cross-slot 20, in which it is subject to leveling adjustment by the two leveling screws 21 extending to or into the bottom of said slot from the underside of the head, and subject also to being clamped by a suitable clamping device 24. Such clamping device preferably works vertically through the jaw-head and centrally with respect to the blade, leaving free (for the accommodation of the work-clamping means 18) the side-portions of said jaw-head contiguous to the cutting blade. Specifically, the device 24 is a tapered nut, engaging a corresponding recess 25, but with a flattened surface 26 to bear against the center of the cutting blade, a screw 27, which extends loosely through an orifice in the bottom of the jaw-head, engaging said nut to draw it down and force it into clamping engagement with the cutting blade.

The yieldable work-clamping means 18, carried by and movable with the jaw 13 may be variously shaped and positioned, but preferably I employ for this purpose a pair of plungers 18 disposed in recesses 28, limited in capacity for axial movement (and also held against rotation about their axes) by stop-pins 29 engaged in receptive slots 30 of the plungers, each such plunger being spring-forced outwardly by coiled spring 31 interposed between the bottom of the plunger and the bottom of the recess. Positioned contiguous to the respective sides of the jaw-head, and preferably closely adjacent to the cutting blade on the side thereof which is toward the shank of the tool, and preferably having somewhat beveled top surfaces as at 33, these work-holding plungers will coact with the surface of any crank-pin within the diameter-capacity of the tool before the cutting-blade can be brought into engagement with the work. Positioned as they are, they interfere in no manner with the ready engagement of the tool with the work and require no otherwise-needless room; thrusting forcefully in the direction of the cradle afforded by the V-jaw, they cause the tool as a whole to cling to the work independently of whether or not the cutting blade is touching the work, thereby both to facilitate the "fine" or accurate setting of the cutting edge, and to prevent any unintentional tilting of the tool out of a plane normal to the axis of the work; and, further, in operation of the structure in effecting a cut, they tend strongly both to prevent "chattering" of the tool even in unexpert hands and to prevent the tool as a whole from loosening and jerking, or digging the blade abruptly into the metal, even in making a very fine cut on an irregular or "out-of-round" shaft. Other advantages derived from the stated construction will be apparent to those skilled in the art.

For desirable production-economy and operative efficiency and convenience, the structure for imparting relative movement as between the two jaws preferably provides an adjusting hand-grip or cylinder 35 internally screw-threaded as at 36, at its lower portion, for engagement with a threaded stem 37 integrally formed in the handle-and-shank forging of the tool. Abutting against the underside of the movable jaw, this adjusting member may forcibly press it toward the V-jaw; and for retraction of the movable jaw only a relatively light connection between the adjusting cylinder and the movable jaw is requisite. The movable jaw is preferably formed with a longitudinally-elongated base portion, to the underside of which is secured a yoke-shaped connecting piece 40, the yoke arms of which engage in a groove 41 formed in the top portion of the adjusting cylinder, the yoke member being secured to the movable jaw by screw 42, and spaced from it by washer 43.

Of course the base portion of the movable jaw is bored to slip over the shank portion of the tool, and to hold said jaw against rotation on the shank, the shank is provided with a longitudinal keyway 45 engaged by a key 46 secured inside of the bore by a screw 47.

It will be understood that while I have herein described in some detail a particular construction advantageously embodying my invention, changes may be made in numerous details of construction and arrangement of parts without departure from the spirit of my invention within the scope of the appended claims.

I claim:

1. A hand-tool for truing crank pins and the like, comprising, in combination, a work-receptive jaw, and a tool carrying jaw in opposed relatively-movable relation, a handle-formed shank fixed to one said jaw and guidingly engaging the other, relatively-movable jaw, means for adjusting the relatively-movable jaw along said shank and positioning it positively at desired distance from the shank-carried jaw, a wide turning-blade positively positioned in the tool-carrying jaw with its protruding cutting-edge toward the shank and work-pressing means carried by the tool-carrying jaw between said blade and the shank and yieldable with respect to said jaw for engaging the work in advance of blade-engagement therewith.

2. A hand-tool for truing crank-pins and the like comprising, in combination, a V-jaw and a tool-carrying jaw in opposed relatively-movable relation, a handle-formed shank fixed to one said jaw and guidingly engaging the other, relatively-movable jaw, means for adjusting the relatively-movable jaw along said shank, a blade carried by said tool-carrying jaw in a plane substantially bisecting the angle of the V-jaw, and means carried by and yieldable with respect to the tool-carrying jaw for engaging the work in advance of blade-engagement therewith.

3. A hand-tool for truing crank-pins and the like comprising, in combination, a V-jaw to receive the work, a handle-formed shank fixed thereto, a cutting blade opposing said V-jaw, and having its cutting edge at the side of the blade nearest to the shank, a yieldable work-clamping means also opposing said V-jaw, and located between the blade and the shank and adjustable means for advancing said cutting blade and said work-clamping means toward the V-jaw in unison.

4. A hand-tool for truing crank-pins and the like comprising, in combination, a V-jaw, a shank-member connected therewith and substantially paralleling a plane bisecting the angle of the V-jaw, a tool-carrying jaw movable along said shank, a blade carried by said jaw in a plane substantially bisecting the angle of the V-jaw, and spring-pressed work-clamping means mounted on and movable with said tool-carrying jaw and disposed to engage the work in advance of blade-engagement therewith.

5. A hand-tool for truing crank-pins and the like comprising, in combination, a V-jaw having a shank-extension substantially paralleling a plane bisecting the angle of the V-jaw, a tool-carrying jaw slidably mounted on said shank, means for adjusting said tool-carrying jaw along said shank, a cutting blade on said tool-carrying jaw, and yielding means mounted on said tool-carrying jaw and arranged to engage and clamp the work in advance of blade-engagement therewith.

6. A hand-tool for truing crank-pins and the like comprising, in combination, a V-jaw having a shank-extension substantially paralleling a plane bisecting the angle of the V-jaw, a tool-carrying jaw slidably mounted on said shank, means for adjusting said tool-carrying jaw along said shank, a cutting blade on said tool-carrying jaw, and yielding means mounted on said tool-carrying jaw and arranged to engage and clamp the work in advance of blade-engagement therewith, said work-clamping means comprising a plurality of spring-pressed plungers.

7. In a device of the character described, the combination of a main element having a handled portion, a threaded portion and a shank portion in alignment, and an overhanging work-receiving jaw, a tool-carrying jaw slidable on said shank portion, a cutting tool carried by said jaw, and means for adjusting said tool-carrying jaw comprising a cylindrical member engaging the screw thread and rotatably connected with the tool-carrying jaw.

8. In a device of the character described, the combination of a main element having a handled portion, a threaded portion and a shank portion in alignment, and an overhanging work-receiving jaw, a tool-carrying jaw slidable on said shank portion, a cutting tool carried by said jaw, and means for adjusting said tool-carrying jaw comprising a cylindrical member engaging the screw thread and rotatably connected with the tool-carrying jaw, said cylindrical member having a circumferential groove in its end adjacent the tool-carrying jaw, and said jaw carrying a part engaging in said groove.

9. A hand-tool for truing crank-pins and the like comprising, in combination, a V-jaw and a tool-carrying jaw in opposed relatively-movable relation, said tool-carrying jaw having in its top a slot in a plane substantially bisecting the angle of the V-jaw and having also a contiguous recess in its top, a cutting blade mounted in said slot, means cooperating therewith to level the blade, a work-holding clamp slidably mounted in said contiguous recess, and a spring in said recess normally maintaining said clamp in projected position with its work-engaging surface beyond the edge of the blade.

10. Structure as set forth in claim 9, wherein the work-clamping means comprises two plungers adjacent opposite side faces of the tool-carrying jaw, combined with blade-retaining clamp means interposed between the positions of said plungers and operatable from the underside of the jaw.

FREDERICK G. WACKER.